(12) United States Patent
Sareyani

(10) Patent No.: US 11,172,645 B2
(45) Date of Patent: *Nov. 16, 2021

(54) DISPOSABLE KITTY LITTER BOX

(71) Applicant: Steve Sareyani, East Northport, NY (US)

(72) Inventor: Steve Sareyani, East Northport, NY (US)

(*) Notice: Subject to any disclaimer, the term of this patent is extended or adjusted under 35 U.S.C. 154(b) by 250 days.

This patent is subject to a terminal disclaimer.

(21) Appl. No.: 16/171,565

(22) Filed: Oct. 26, 2018

(65) Prior Publication Data

US 2019/0216042 A1 Jul. 18, 2019

Related U.S. Application Data

(63) Continuation of application No. 14/958,219, filed on Dec. 3, 2015, now Pat. No. 10,111,403.

(60) Provisional application No. 62/285,696, filed on Nov. 6, 2015, provisional application No. 62/285,595, filed on Nov. 3, 2015, provisional application No. 62/285,678, filed on Nov. 5, 2015.

(51) Int. Cl.
*A01K 1/01* (2006.01)

(52) U.S. Cl.
CPC .................. *A01K 1/0125* (2013.01)

(58) Field of Classification Search
CPC .. A01K 27/004; A01K 27/005; A01K 27/006; A01K 27/007; A01K 27/008; A01K 27/009; A01K 1/0125; A01K 1/0107; A01K 1/0114

USPC ....... 119/161, 165, 167, 168, 169, 170, 796, 119/797, 798, 799, 801, 802, 803, 804, 119/807

See application file for complete search history.

(56) References Cited

U.S. PATENT DOCUMENTS

| | | | | | |
|---|---|---|---|---|---|
| 5,325,815 | A | * | 7/1994 | Gumpesberger | A01K 1/0114 119/166 |
| 5,517,947 | A | * | 5/1996 | Christman | A01K 1/0114 119/165 |
| 5,566,641 | A | * | 10/1996 | Radii | A01K 1/0125 119/168 |
| 5,615,639 | A | * | 4/1997 | Knight | A01K 1/0125 119/168 |
| 5,645,212 | A | * | 7/1997 | Potter | B65D 5/64 229/101 |
| 5,797,346 | A | * | 8/1998 | Lewis | A01K 1/0114 119/166 |
| 5,878,693 | A | * | 3/1999 | Green | A01K 1/0107 119/168 |
| 7,597,063 | B2 | * | 10/2009 | Hartzell | A01K 1/0125 119/166 |
| 8,235,006 | B2 | * | 8/2012 | Lipscomb | A01K 1/0114 119/166 |
| 2012/0325159 | A1 | * | 12/2012 | Penner | A01K 1/0114 119/166 |

* cited by examiner

*Primary Examiner* — Ebony E Evans
(74) *Attorney, Agent, or Firm* — Glenn F. Savit, P.C.

(57) ABSTRACT

A disposable kitty litter box is provided. The disposable kitty litter box includes a base portion and a plurality of layer portions each including a plurality of apertures. In an assembled configuration, the plurality of apertures of each layer portion of the plurality of layer portions are offset from each other to keep kitty litter from passing between a plurality of apertures of a top layer portion.

2 Claims, 7 Drawing Sheets

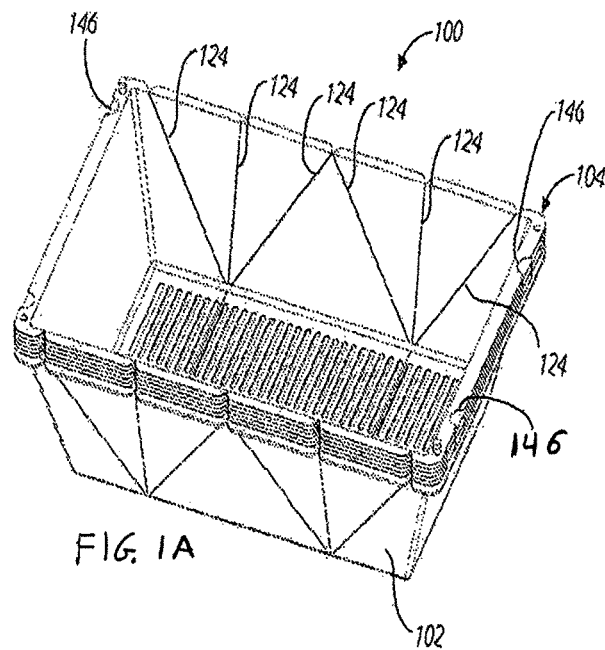
FIG. 1A
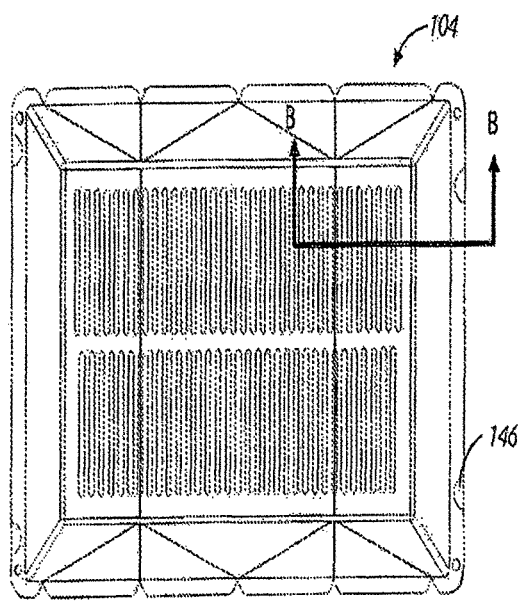
FIG. 1B
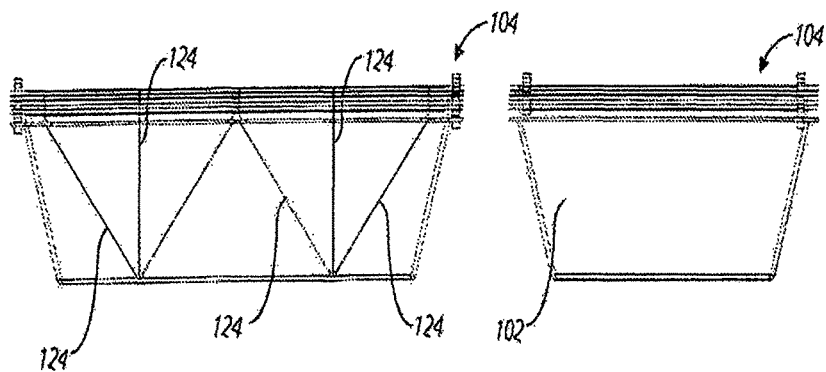
FIG. 1C
FIG. 1D
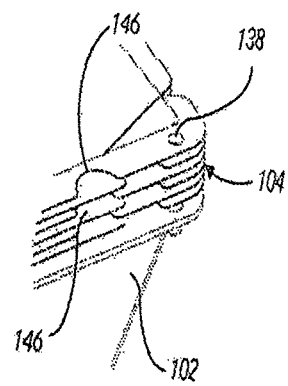
FIG. 1E

SECTION B-B

Section A-A

DISPOSABLE KITTY LITTER BOX

PRIORITY

The present application claims priority to U.S. patent application Ser. No. 14/958,219, filed on Dec. 3, 2015, which claims priority to U.S. Provisional Application Ser. Nos. 62/285,696, which was filed on Nov. 6, 2015, 62/285,595, which was filed on Nov. 3, 2015, and 62/285,678, which was filed on Nov. 5, 2015, the contents of each of which are incorporated herein by reference.

BACKGROUND

Field of the Disclosure

The present disclosure relates to a disposable kitty litter box, and more particularly, to a disposable kitty litter box including a plurality of disposable kitty litter layer portions.

Description of the Related Art

A kitty litter box is commonly used to accommodate the daily functions of a cat. The upkeep of a kitty litter box is crucial to the comfort of a cat and/or the enjoyment of a cat by the pet's owner. Specifically, a cat will interact with the kitty litter while relieving its bodily needs. After a period of use, the owner will have to clean the kitty litter, as the kitty litter box will reach a sanitarily unacceptable condition. If the owner is unable to clean the kitty litter box, the cat may reject the kitty litter box and instead seek alternate locations, such as rugs, floors, furniture, and plants. Additionally, the sanitarily unacceptable kitty litter will often produce an undesirable odor and may be of a non-hygienic nature. Consequently, a cat owner must be extremely conscientious about replacing kitty litter on a timely basis.

Therefore, a need exists for kitty litter box that is easy to clean.

SUMMARY

As can be appreciated, a disposable kitty litter box including a plurality of disposable kitty litter layer portions may prove useful with regard to maintaining kitty litter in a sanitarily acceptable condition.

An aspect of the present disclosure provides a disposable kitty litter box. The disposable kitty litter box includes a base portion and a plurality of layer portions each including a plurality of apertures. In an assembled configuration, the plurality of apertures of each layer portion of the plurality of layer portions are offset from each other to keep kitty litter from passing between a plurality of apertures of a top layer portion.

Another aspect of the present disclosure provides a disposable kitty litter box. The disposable kitty litter box includes a base portion including at least one bottom fold line and a plurality of layer portions each including a plurality of apertures and at least one bottom fold line. In the assembled configuration, the base portion and the plurality of layer portions are movable from an unfolded configuration to a folded configuration for transporting the foldable disposable kitty litter box.

BRIEF DESCRIPTION OF THE DRAWING

Various embodiments of the present disclosure are described hereinbelow with references to the drawings, wherein:

FIG. 1A is a perspective view of a disposable kitty litter box including a plurality of disposable kitty litter portions, according to an embodiment of the present disclosure;

FIG. 1B is a top view of the disposable kitty litter box;

FIG. 1C is a side view of the disposable kitty litter box;

FIG. 1D is a front view of the disposable kitty litter box;

FIG. 1E is a partial perspective view of a corner of the disposable kitty litter box;

FIG. 4B also shows an enlarged area of detail;

FIG. 4D also shows an enlarged area of detail;

DETAILED DESCRIPTION

Detailed embodiments of the present disclosure are disclosed herein; however, the disclosed embodiments are merely examples of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

As noted above, a disposable kitty litter box including a plurality of disposable kitty litter portions may prove useful with regard to maintaining kitty litter in a sanitarily acceptable condition, and such a kitty litter box is herein described.

FIGS. 1A-1G illustrate various views of a disposable kitty litter box 100, according to an embodiment of the present disclosure. The disposable kitty litter box 100 includes a base portion 102 and a plurality of stackable layer portions 104 (layer portions 104) that connect to each other and to, via a bottom one of the plurality of portions 104, the base portion 102, as will be described in greater detail below. In FIGS. 1A-1G, the layer portions 104 are shown including six layer portions.

The base portion 102 and the layer portions 104 may be formed from any suitable material (e.g., plastic), and may be formed using one or more suitable manufacturing methods, such as, for example, one or more suitable molding processes. Forming the base portion 102 and the layer portions 104 from plastic keeps the disposable kitty litter box relatively lightweight and, thus, easy to carry if a user should decide to transport disposable kitty litter box 100, and keeps manufacturing cost relatively low.

Figure 2A:
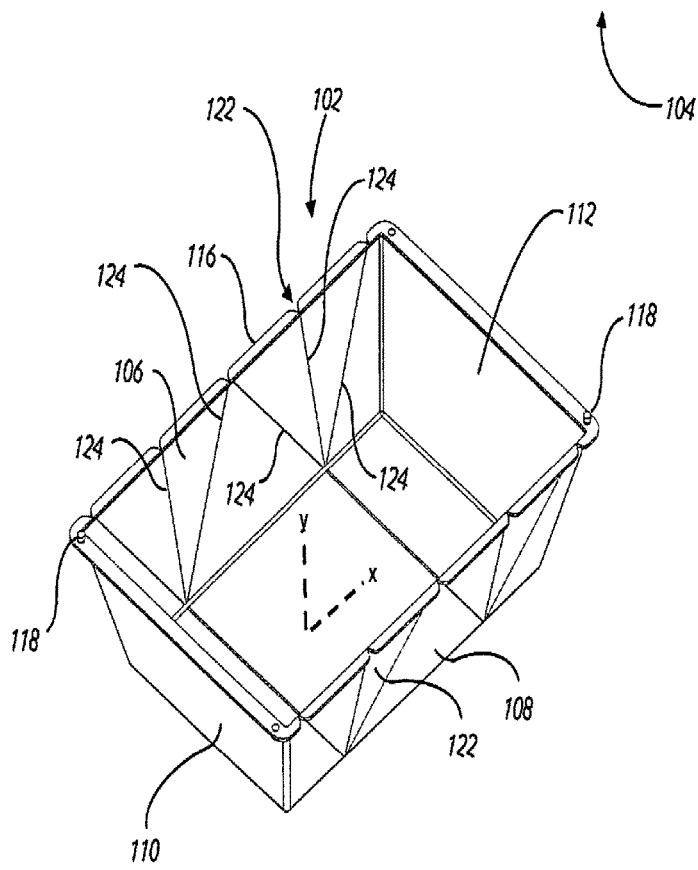
FIG. 2A is a perspective view of a base portion of the disposable kitty litter box.

FIG. 2A is a perspective view of the base portion 102 of the disposable kitty litter box 100. The base portion 102 includes a generally rectangular configuration that is defined by sidewalls 106 and 108 which connect to opposing end walls 110 and 112, thereby forming the base portion 102.

A length of the sidewalls 106, 108 can range from about 18 inches to about 20 inches, but other lengths are contemplated. For example, the length of the sidewalls 106, 108 can be less than or greater than 18 inches and less than or greater than 20 inches.

In the illustrated embodiment, the sidewalls 106, 108 have a length at a bottom portion thereof that is less than a length at a top portion thereof so that the sidewalls 106, 108 are angled relative to a horizontal axis that is defined through the disposable kitty litter box 100. For example, the bottom portion of the sidewalls 106, 108 can have a length that is about 18 inches and the top portion of the sidewalls 106, 108 can have a length that is about 21 inches (see FIGS. 2B and 2D).

A length of the end walls 110, 112 can range from about 14 inches to about 20 inches, but other lengths are contemplated. For example, the length of the end walls 110, 112 can be less than or greater than 14 inches and less than or greater than 20 inches. As described above with respect to the sidewalls 106, 108, the ends walls 110, 112 can have a length at a bottom portion thereof that is less than a length at a top portion thereof so that the ends walls 110, 112 are angled relative to the horizontal axis that is defined through the disposable kitty litter box 100 (see FIG. 2C, for example).

In the illustrated embodiment, the angle of the sidewalls 106, 108 and the end walls 110, 112 relative to the horizontal axis can range from about 60 degrees to about 75 degrees, but other angles are contemplated. For example, the angle of the sidewalls 106, 108 and the end walls 110, 112 relative to the horizontal axis can be less than or greater than 60 degrees and less than or greater 75 degrees.

A height of the sidewalls 106, 108 and end walls 110, 112 can range from about 3 inches to about 8 inches, but other heights are contemplated. For example, the height of the sidewalls 106, 108 and end walls 110, 112 can be less than or greater than 3 inches and less than or greater than 8 inches.

A bottom surface 114 (or floor) is provided on the base portion 102 and connects to the sidewalls 106, 108 and the end walls 110, 112, thereby forming a substantially enclosed base portion 102, which is able to contain kitty litter therein. As can be appreciated, the bottom surface 114 includes a length and a width that is equal to the lengths of the bottom portions of the sidewalls 106, 108 and the end walls 110, 112.

A thickness of the bottom surface 114, sidewalls 106, 108 and end walls 110, 112 can range from about 0.08 inches to about 0.12 inches, but other thicknesses are contemplated. For example, the thickness of the sidewalls 106, 108 and end walls 110, 112 can be less than or greater than 0.08 inches and less than or greater than 0.12 inches.

A lip 116 extends along an outside perimeter of the base portion 102 and includes one or more snap features in the form of one or more upwardly facing protrusions 118 (FIGS. 2A, 2C, and 2D) and one or more downwardly facing protrusions 120 (FIGS. 2C and 2D), each of which are located at upper corners of the lip 116. The upwardly facing protrusions 118 and downwardly facing protrusions 120 include a substantially hollow configuration that allows the upwardly facing protrusions 118 and the downwardly facing protrusions of the base portion 102 to releasably engage corresponding upwardly facing protrusions 118 and downwardly facing protrusions 120 that are disposed on the layer portions 104, as will be described in greater detail below. As can be appreciated, the upwardly facing protrusions 118 and downwardly facing protrusions 120 on the base portion 102 can also engage each other.

The lip 116 can have the same thickness as the thickness of the bottom surface 114, the sidewalls 106, 108 and end walls 110, 112, or the lip 116 can have a thickness that is less than or greater than a thickness of the sidewalls 106, 108 and end walls 110, 112.

Figure 2B:
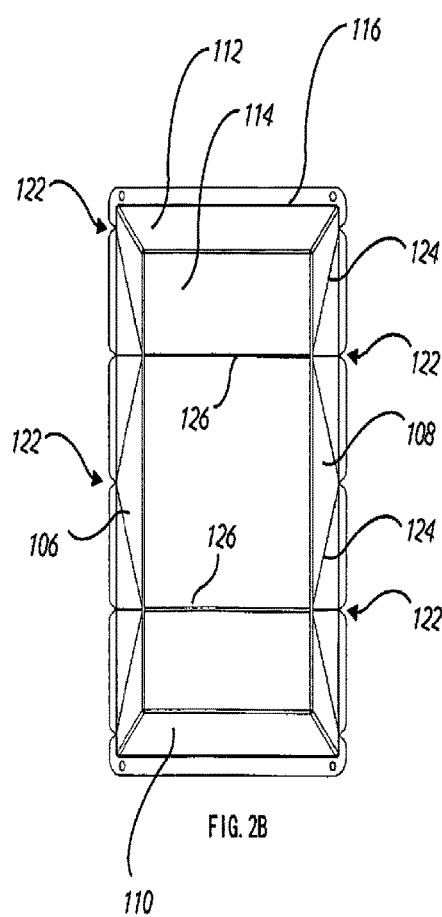
FIG. 2B is a top view of the base portion.
Figure 2C:
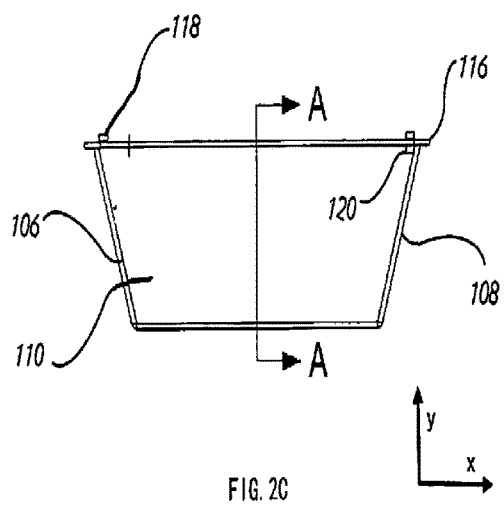
FIG. 2C is a front view of the base portion.
Figure 2D:
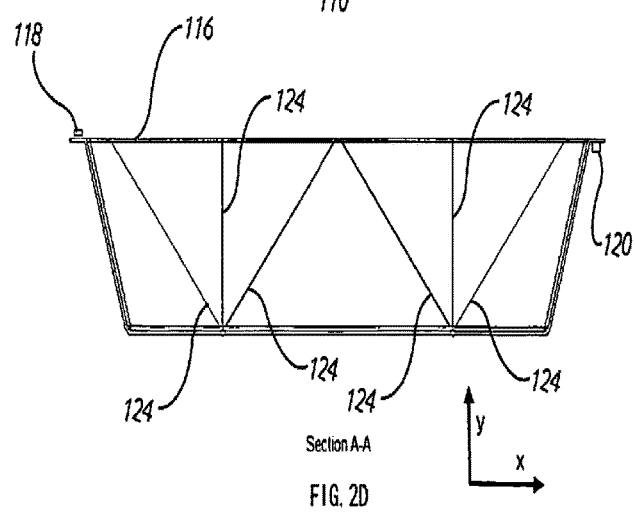
FIG. 2D is a cutaway view of the base portion taken along line segment "A-A" of FIG. 2C.

One or more bend reliefs in the form of slits 122 are disposed on a portion of the lip 116 that is provided along the sidewalls 106, 108 (see FIGS. 2A and 2B, for clarity, only a few of the slits 122 have been provided with reference numbers in these FIGs.). Additionally, each of the sidewalls 106, 108 includes a plurality of angular side fold lines 124 (e.g., each of the sidewalls 106, 108 include six angular side fold lines 124) and a pair of bottom fold lines 126 are provided on the bottom surface 114 of the base portion 102 (see FIGS. 2A and 2B, for clarity, only a few of the angular side fold lines 124 have been provided with reference numbers in these FIGs.).

The angular side fold lines 124 can be oriented at any suitable angle relative to the x and y axes that are defined through the base portion 102 of the disposable kitty litter box 100. For example, in the illustrated embodiment the angular side fold lines are oriented at a 45 degree angle in relation to the x and y axes.

The slits 122, the angular side fold lines 124, and the pair of bottom fold lines allow a user to move the base portion 102, in the assembled configuration (i.e., with stacked layer portions 104 connected thereto), from a unfolded configuration to a folded configuration, and vice versa, as will be described in greater detail below.

Figure 3:
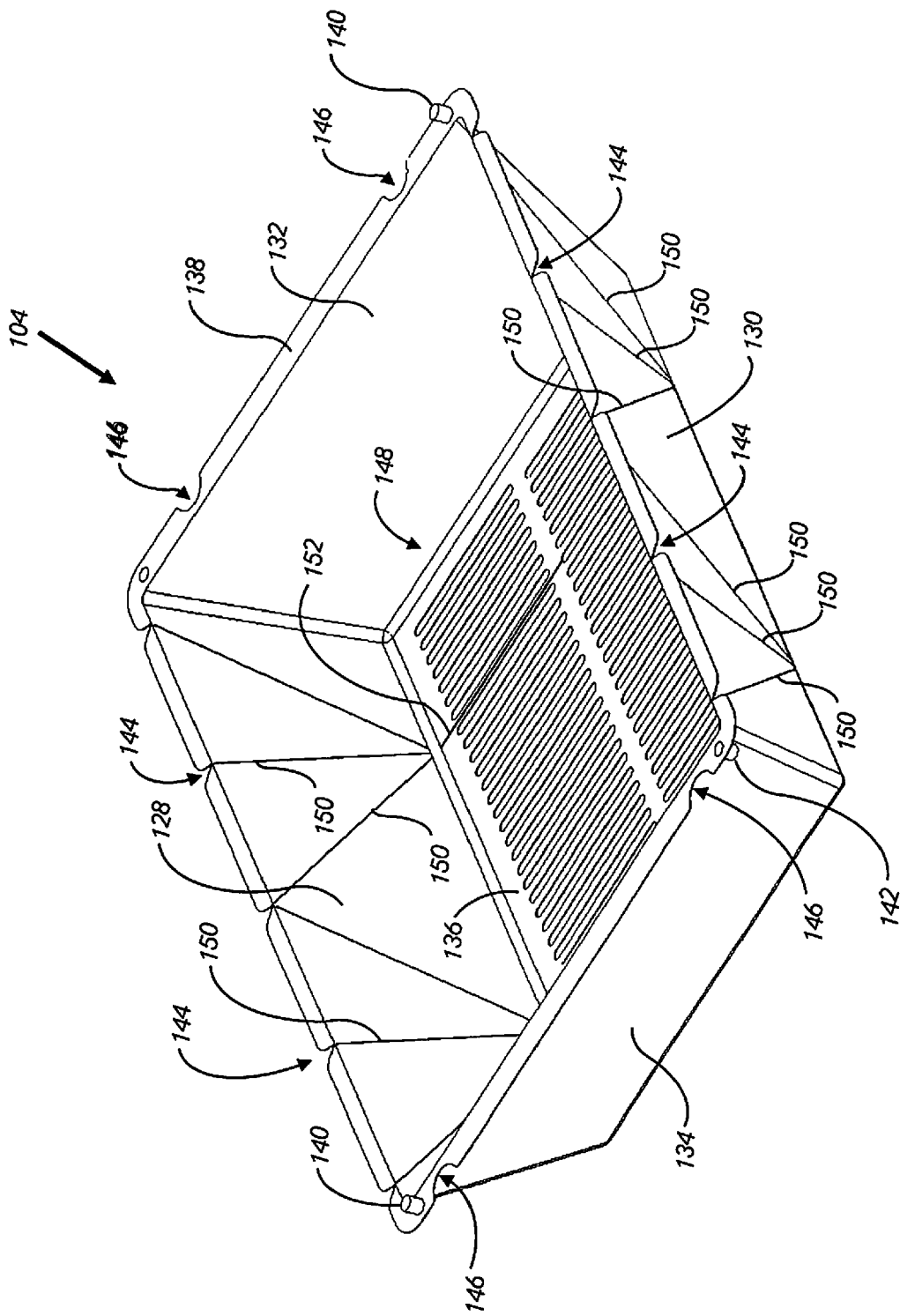
FIG. 3 is a perspective view of a layer portion of the disposable kitty litter box.
Figure 4:
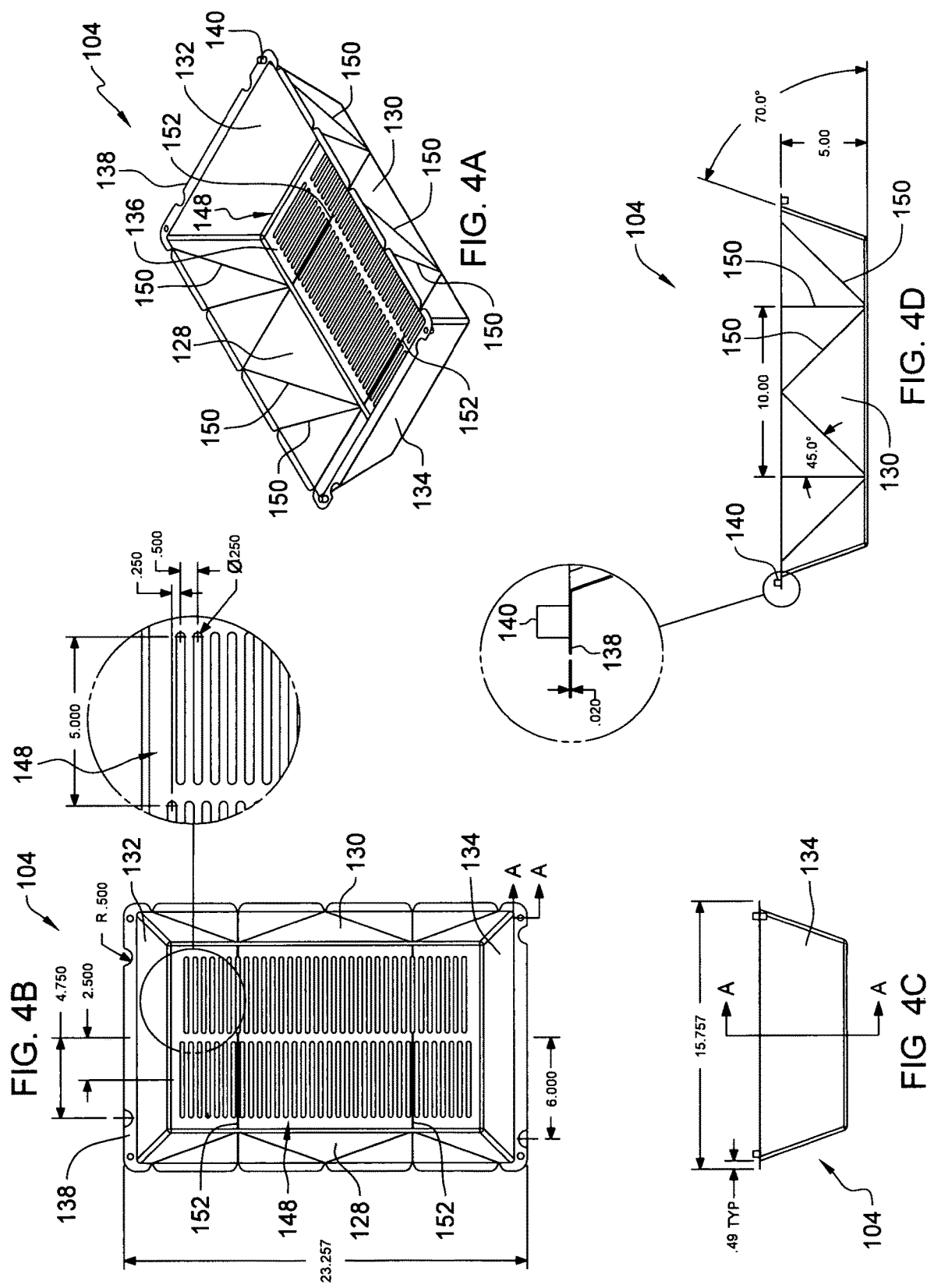
FIG. 4A is another perspective view of the layer portion.
FIG. 4B is a top view of the layer portion.
FIG. 4C is a front view of the layer portion.
FIG. 4D is a side view of the layer portion.

Referring to FIGS. 3-4D, the disposable kitty litter box 100 includes the layer portions 104. For illustrative purposes, since each layer portion of the layer portions 104 are identical to each other, only one layer portion is shown in these FIGs. and will be herein simply referred to as the layer portion 104.

Similarly to the base portion 102, the layer portion 104 includes sidewalls 128, 130, end walls 132, 134, a bottom surface 136, and a lip 138, which includes upwardly facing projections 140, downwardly facing projections 142, and slits 144. As the sidewalls 128, 130, the end walls 132, 134, the bottom surface 136, and the lip 138 are configured identically to the corresponding components of the base portion 102, a detailed description of these components will not be provided herein.

It is noted, however, that the dimensions of the sidewalls 128, 130, the end walls 132, 134, the bottom surface 136, and the lip 138 may be the same as or different from the dimensions of the corresponding components of the base portion 102. For example, the dimensions of the sidewalls 128, 130, the end walls 132, 134, and the bottom surface 136 may be slightly smaller than the dimensions of the corresponding components of the base portion 102, as the layer 104 is configured to fit inside of the base portion 102.

Similarly, the lip 138 may be slightly larger than the lip 116 of the base portion 102 so that the lip 138 of the layer portion 104 can be aligned with the lip 116 of the base portion 102.

Unlike the lip 116 of the base portion 102, the lip 138 of the layer portion 104 also includes one or more finger clearance notches 146 (notches 146). In the illustrated embodiment, a pair of notches 146 are disposed on a portion of the lip 138 that extends along the end walls 132 134. The notches 146 include a radius that ranges from about 0.3 inches to about 0.6 inches, but the radius can be less than or greater than 0.3 inches and less than or greater than 0.6 inches.

The pair of notches 146 that are disposed on the portion of the lip 138 that extends along the end wall 132 and the pair of notches 146 that are disposed on the portion of the lip 138 that extends along the end 134 do not align with each other when the layer portions 104 are in the stacked configuration (see FIGS. 1A, 1B, 1E, and 1F). More particularly, the pair of notches 146 that are disposed on the portion of the lip 138 that extends along the end wall 134 are provided closer to the corners of the lip 138 than the pair of notches 146 that are disposed on the portion of the lip 138 that extends along the end wall 132 (FIG. 3). Configuring the notches 146 in such a manner allows a user to easily grasp a top layer portion of the stacked layer portions 104. That is, since the notches do not align vertically with each other, a lip of a bottom layer portion will be positioned directly below a notch of a top layer portion, thereby allowing a user to slip their finger under the notch of the top layer portion and lift and remove the top layer portion from the remaining stacked bottom layer portion(s) that are connected to the base portion 102.

A plurality of apertures 148 (apertures 148) are provided along the bottom surface 136 of the layer portion 104 and are configured to allow unused kitty litter to pass therethrough when a user lifts and removes a top layer portion from a bottom layer portion. In the illustrated embodiment, two rows of apertures 148 extend along the bottom surface 136.

The plurality of apertures 148 can have any suitable configuration including, but not limited to a circular configuration, a rectangular configuration, etc. In the illustrated embodiment, the apertures 148 are shown including a generally oblong configuration with a radius that ranges from about 0.25 inches to about 0.3 inches, but other radii are contemplated. A length of the apertures can range from about 3 inches to about 6 inches, but other lengths are contemplated.

The apertures 148 in each row can be spaced apart from each other by any suitable distance. For example, the apertures 148 can be spaced apart from each other at a distance that ranges from about 0.45 inches to about 0.5 inches, but other distance are contemplated.

The layer portion 104 includes angular side fold lines 150 (see FIG. 3, for example) that are identical to the angular side fold lines 124 of the base portion 102 and includes a pair of bottom fold lines 152, which extend from sidewall 128 to sidewall 130 and between adjacent apertures of the apertures 148 (see FIGS. 3 and 4B).

The angular fold lines 124 and the bottom fold lines 126 of the base portion 102 and the angular fold lines 150 and the bottom fold lines 152 of the layer portion 104 allow a user to move the disposable kitty litter box 100, in an assembled configuration, from an unfolded configuration to a folded configuration. For illustrative purposes, with reference to FIGS. 5 and 6, a folding procedure of the layer portion 104 is shown.

For example, a user can move the end walls 132 and 134 of the layer portion 104 toward each other. In doing so, the layer portion 104 will fold along the angular fold lines 150 and the bottom fold lines 152 until the upwardly facing projections 140 engage a corresponding downwardly facing projection 142, which upon engagement thereof maintains the layer portion 104 in the folded configuration.

As can be appreciated, the same folding procedure can be used for folding stacked layer portions 104 that are connected to the base portion 102, as the base portion 102 includes the angular fold lines 124 and the bottom fold lines 126, which are identical to and aligned with the angular fold lines 150 and the bottom fold lines 152 of the layer portion 104.

It is noted that the aforementioned folding procedure of the disposable kitty litter box 100 can be performed with or without kitty litter in the disposable kitty litter box 100.

Use of the disposable kitty litter box 100 is now described. In the assembled configuration, the base portion 102 is connected to stacked layer portions 104, via the upwardly facing projections 118 and the downwardly facing projections 120 of the base portion 102 being engaged with the corresponding upwardly facing projections 140 and the downwardly facing projections 142 of the layer portions 104 (see FIGS. 1A and 1G, for example).

Figure 1F:
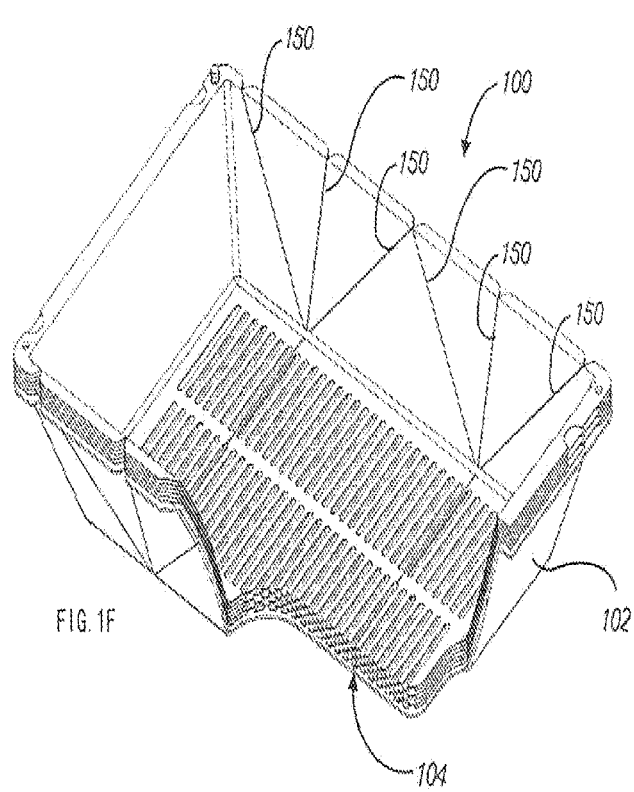
FIG. 1F is a partial cutaway view of the disposable kitty litter box.
Figure 1G:
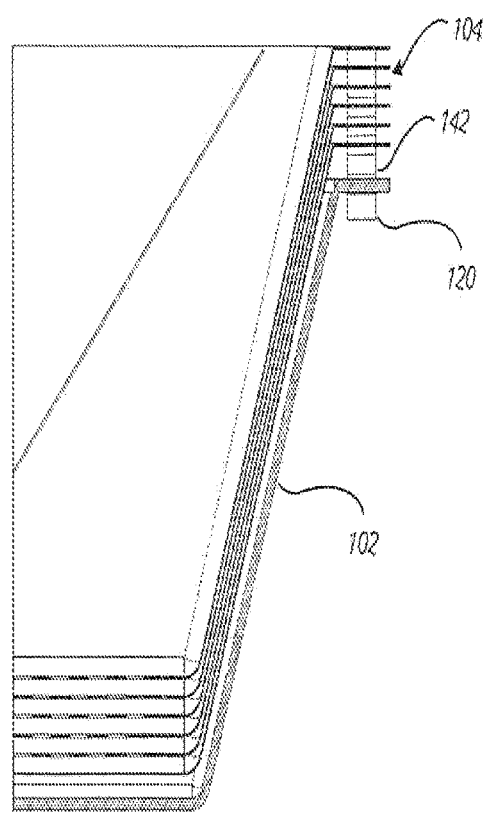
FIG. 1G is a partial cutaway view of the disposable kitty litter box taken along line segment "B-B" of FIG. 1B.

In accordance with the instant disclosure, the upwardly facing projections 140 and the downwardly facing projections 142 of the layer portions 104 allow the individual layer portions to be stacked only in an alternating manner (see FIG. 1F, for example). That is, when the layer portions 104 are stacked, the apertures 148 of each layer portion do not align with each other, e.g., they are offset from each other. Accordingly, when two layer portions are stacked upon each other, kitty litter (and/or cat waste) contained in the disposable kitty litter box 100 is prevented from passing between the stacked layer portions.

When a user desires to clean the disposable kitty litter box 100, a user simply lifts a top layer portion from the stacked layer portions 104. As noted above, a user can grasp the top layer portion via the notches 146 that are provided on the top portion and use the lip of the layer portion beneath the top layer portion for leverage to facilitate removing the top layer portion from the stacked layer portions that remain attached to each other and the base portion 102.

Once the top layer portion is removed, a user can shake (or perform one or more other suitable movements) the removed layer portion over the next top layer portion so that unused kitty litter can be returned to the next top layer portion, and the removed layer portion including the cat waste left therein can be discarded.

The disposable kitty litter box 100 described herein overcomes the aforementioned shortcomings that are typically associated with conventional kitty litter boxes. That is, once fresh kitty litter reaches a sanitarily unacceptable condition, the kitty litter box 100 provides a fast and easy way for a user to return the kitty litter box 100 to a clean and sanitary condition.

While the kitty litter box 100 has been described herein including the base portion 102 and the layer portions 104, the present disclosure is not so limited. More particularly, the base portion 102 and the layer portions 104 can be sold separately and assembled by a user. Moreover, while the layer portions 104 have been descried herein as including six layer portions, the present disclosure is not so limited, as the plurality of layer portions need only include a minimum of two layer portions.

Additionally, the disposable kitty box 100 can be used by individual cat owners, by pet stores, veterinarians, pet hospitals, pet boarding service providers, etc.

From the foregoing and with reference to the various figure drawings, those skilled in the art will appreciate that certain modifications can also be made to the present disclosure without departing from the scope of the same. For example, the layer portions 104 may be provided with a plurality of detents and a plurality of indents.

More particularly, and with reference to FIGS. 7A-7F, a layer portion 204a that is configured for use with the kitty litter box 100 is illustrated.

Figure 7A:
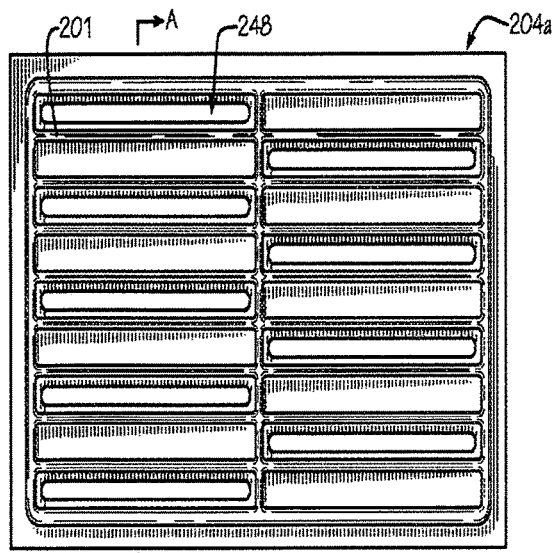
FIG. 7A is a top view of a portion of a layer portion of the disposable kitty litter box, according to an alternate embodiment of the present disclosure.
Figure 7D:
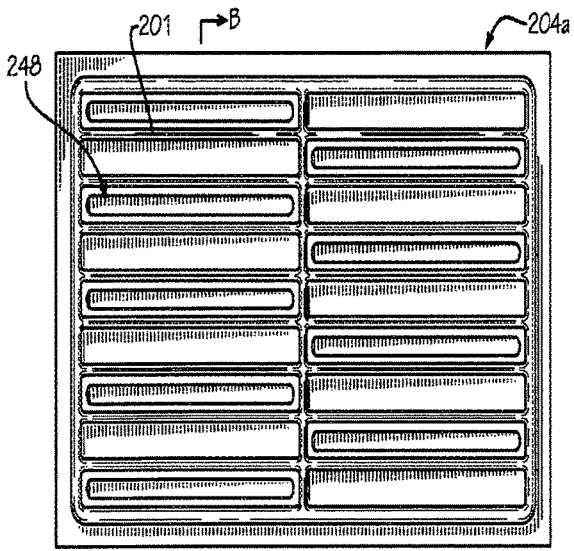
FIG. 7D is a top view of a portion of two layer portions of FIG. 7A shown in a stacked configuration.
Figure 7B:
FIG. 7B is a side view of the layer portion of FIG. 7A.
Figure 7E:
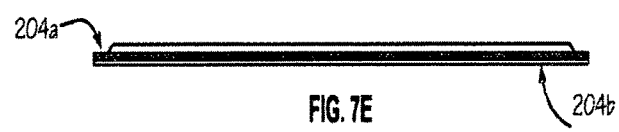
FIG. 7E is a side view of the layer portions of FIG. 7D.
Figure 7C:
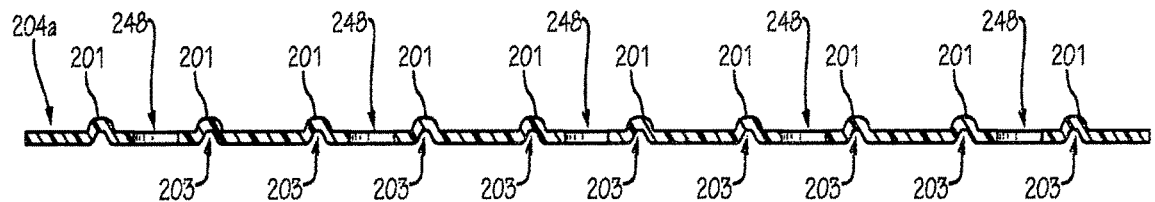
FIG. 7C is a cross-sectional view taken along line segment "A-A" of FIG. 7A.

Unlike the layer portion 104, a layer portion 204a includes a plurality of detents 201 and a plurality of indents 203 (FIG. 7C) that extend around a corresponding one of each of a plurality of apertures 248 on the layer portion 204a of layer portions 204. In FIG. 7A, only the detents 201 are shown. Similarly in FIG. 7D, which shows two stacked layer portions 204a and 204b, only the detents 201 are shown.

Figure 7F:
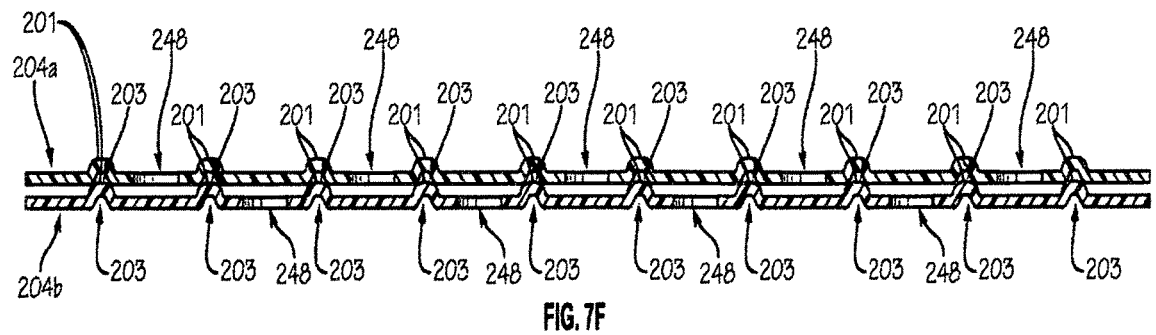
FIG. 7F is a cross-sectional view taken along line segment "B-B" of FIG. 7D.

As illustrated in FIG. 7F, each of the plurality of detents 201 on the layer portion 204a is configured to engage a corresponding one of the plurality of indents 203 of a layer portion 204b, which is positioned below the layer portion 204a, when the disposable kitty litter box 100 is in the assembled configuration.

With the plurality of detents 201 engaged with the corresponding plurality of indents 203, a seal is formed therebetween and an added barrier of protection is provided around the apertures 248 when the layer portions 204a and 204b are in a stacked configuration. That is, cat urine that is not immediately absorbed by the kitty litter is prevented from seeping through the apertures 248, thereby reducing or eliminating the likelihood of cat urine pooling or accumulating at the bottom surface 114 of the base portion 102.

The plurality of detents 201 and corresponding plurality of indents 203 can be monolithically formed with the layer portions 204.

Figure 5:
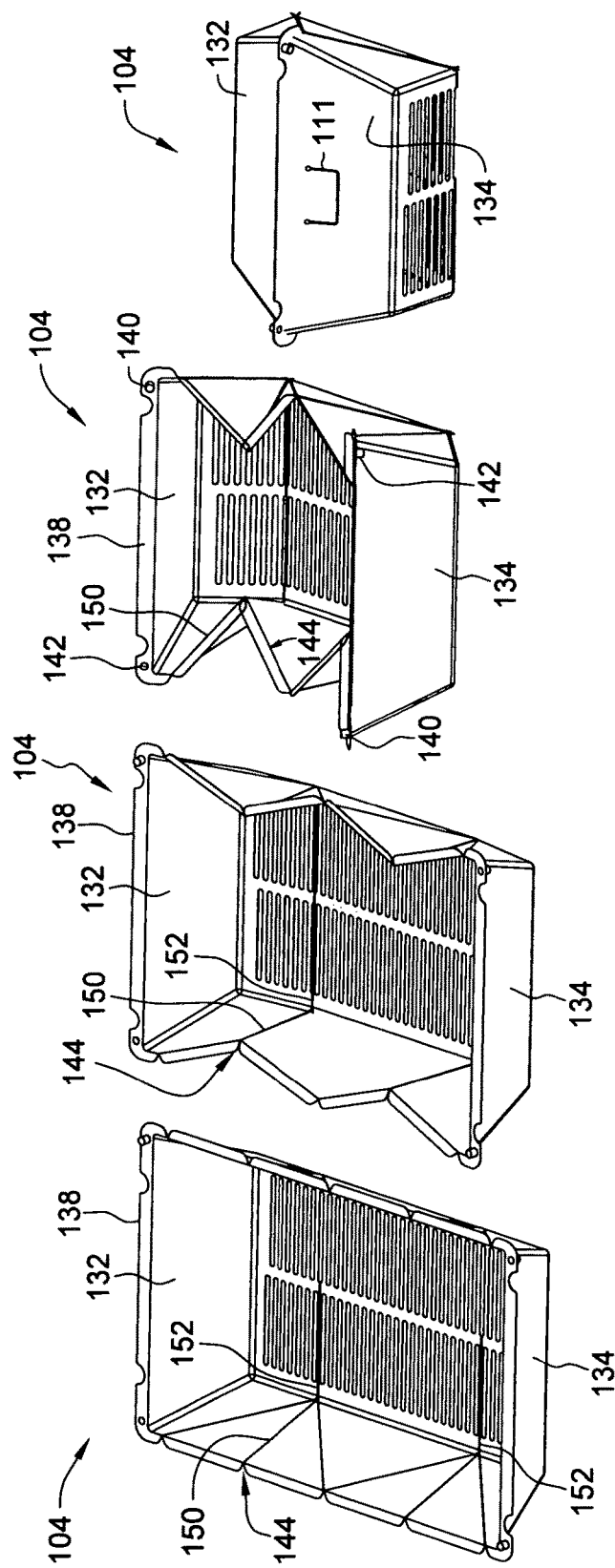
FIG. 5 is a diagram illustrating a folding method of the disposable kitty litter box.
Figure 6:
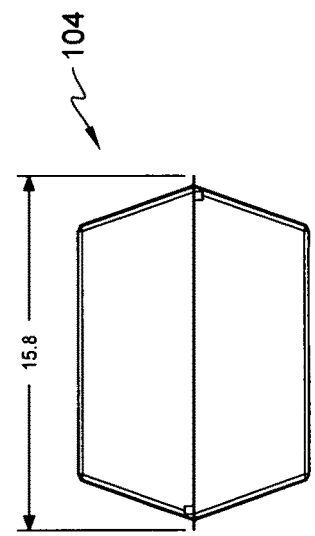
FIG. 6 is a side view illustrating the disposable kitty litter box in a folded configuration.

In addition to the foregoing, a handle can be provided on one of the aforementioned sidewalls and/or end walls of the base portion 102. For example, an exterior surface of one or both of the end walls 110, 112 may be provided with a handle 111 (or other suitable device) that can be used by a user for carrying the disposable kitty litter 100 when its in the folded configuration, as shown in FIG. 5.

Moreover, while the base portion 102 and layer portions 104 have been described herein as including upwardly facing projections and downwardly facing projections, the present disclosure is not so limited. For example, one or more polarized magnets may be provided at the corners of the lips 114/138 and may be configured to maintain each layer portion of the layer portions 104 in an engaged configuration with each other.

For example, with respect to the base portion 102, a magnet having a north polarity can be provided on a corner of end wall 110 and a magnet having a south polarity can be provided on the other corner of the end wall 110; an opposite magnet configuration can be provided the end wall 112, and a similar magnet configuration can be provided on each layer of the layer portions 104. As can be appreciated, such a magnet configuration ensures that the layer portions 104 will be stacked in an alternating configuration as described above with respect to the upwardly facing projections and downwardly facing projections.

Furthermore, while the base portion 102 and layer portions 104 have been described herein including a pair of bottom fold lines 126, the present disclosure is not so limited. For example, the base portion 102 and layer portion 104 can each include one or three or more bottom fold lines 126, as opposed to two. Similarly, more or less than six angular side fold lines 124 can be provided on the base portion 102 and layer portions 104.

While not explicitly illustrated in the drawings, the disposable kitty litter box 100 may also include a cover that is configured to attach to the base portion 102 or a top layer portion of the layer portions 104. The cover may include one or more components, e.g., upwardly facing projections, downwardly facing projects, magnets, or other suitable device, that is/are configured to removable attach to the base portion 102 or a top layer portion of the layer portions 104.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:
1. A kitty litter box, comprising:
a base portion;
a plurality of layer portions each including a plurality of apertures and detent/indent structures;
wherein, in an assembled configuration, the plurality of layer portions are arranged in a stack, the plurality of apertures of each said layer portion are offset from each other to keep kitty litter from passing between the stacked layer portions, and indents of the detent/indent structures of a top layer portion of the layer portions engage with detents of a next, lower layer portion of the layer portions to thereby form a seal therebetween and prevent seepage of liquid through the apertures of the top layer portion; and
in each of the layer portions, in a first direction, the detent/indent structures are arranged with respect to the apertures in at least one sequence of: a first detent/indent structure, a first aperture, a second detent/indent structure, a flat surface, a third detent/indent structure, and a second aperture, the flat surface extending continuously between the second and third detent/indent structures and facing an aperture of a next layer portion in the stack.

2. The kitty litter box according to claim 1, wherein the base portion and each layer portion of the plurality of layer portions includes at least one upwardly facing protrusion and at least one downwardly protrusion.

* * * * *